United States Patent
Matsuda (10) Patent No.: US 9,177,382 B2
(45) Date of Patent: Nov. 3, 2015

(54) IMAGE PROCESSING APPARATUS FOR FORMING SYNTHETIC IMAGE AND IMAGE PROCESSING METHOD FOR FORMING SYNTHETIC IMAGE

(71) Applicant: SEIKO EPSON CORPORATION, Tokyo (JP)

(72) Inventor: Kan Matsuda, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 273 days.

(21) Appl. No.: 13/853,493

(22) Filed: Mar. 29, 2013

(65) Prior Publication Data

US 2013/0266209 A1 Oct. 10, 2013

(30) Foreign Application Priority Data

Apr. 4, 2012 (JP) ................................. 2012-085693

(51) Int. Cl.
*G06T 15/00* (2011.01)
*G06T 7/00* (2006.01)
*H04N 13/00* (2006.01)

(52) U.S. Cl.
CPC .......... *G06T 7/0075* (2013.01); *H04N 13/0022* (2013.01)

(58) Field of Classification Search
None
See application file for complete search history.

(56) References Cited

U.S. PATENT DOCUMENTS

| 8,081,206 B2 * | 12/2011 | Martin et al. ................. 348/42 |
| 2010/0302355 A1 * | 12/2010 | Tamaru ........................ 348/59 |
| 2011/0018969 A1 * | 1/2011 | Tanaka ........................ 348/47 |
| 2011/0304710 A1 * | 12/2011 | Ito et al. ..................... 348/51 |

FOREIGN PATENT DOCUMENTS

| JP | 2003-209858 A | 7/2003 |
| JP | 2004-104329 A | 4/2004 |
| JP | 2004-129186 A | 4/2004 |
| JP | 2005-159755 A | 6/2005 |
| JP | 2011-171813 A | 9/2011 |
| JP | 2011-180779 A | 9/2011 |

\* cited by examiner

*Primary Examiner* — Brian P Werner
(74) *Attorney, Agent, or Firm* — Global IP Counselors, LLP (57) ABSTRACT

To provide a solution by which adjustment of the depth display of the image can be easily carried out by the user at will in a technique for forming a 3-D image from plural images, from the plural feed images, one feed image is extracted as the reference feed image, with an object recognition process being carried out to extract the object region having the prescribed characteristic features. The reference feed image IL is displayed on the display unit 108 together with the markers MK indicating the object regions, and the user selects one object region. A region that is similar in image content with the selected region is detected from each other feed image, with the images being shifted so that the regions overlap each other.

8 Claims, 7 Drawing Sheets

IMAGE PROCESSING APPARATUS FOR FORMING SYNTHETIC IMAGE AND IMAGE PROCESSING METHOD FOR FORMING SYNTHETIC IMAGE

CROSS-REFERENCE TO RELATED APPLICATIONS

This application claims priority to Japanese Patent Application No. 2012-085693 filed on Apr. 4, 2012. The entire disclosure of Japanese Patent Application No. 2012-085693 is hereby incorporated herein by reference.

BACKGROUND

1. Technical Field

The present invention relates to an image processing apparatus and an image processing method that form a 3-D viewable synthetic image from plural feed images. In particular, the invention relates to processing for forming a 3-D viewable synthetic image by the combination with a lenticular lens.

2. Background Technology

As a scheme for the 3-D display of images, the method that exploits the parallax of vision by two eyes has been adopted in practical applications. For example, for a lenticular image, from the plural images taken from views being different, rectangular images are cut out, with a parallax-attached synthetic image being formed as these rectangular images are arranged side by side sequentially corresponding to the configuration of the views. As the synthetic image is presented via a lenticular lens, there is a parallax between the images that reach the left eye and the right eye, respectively, so that the object can be viewed in 3-D.

Schemes that automatically form the lenticular image or some other 3-D viewable synthetic image from the plural feed images taken from different views have been proposed (for example, see Patent Document 1 and Patent Document 2).

Japanese Laid-open Patent Publication No. 2004-104329 (for example, FIG. 8) (Patent Document 1) and Japanese Laid-open Patent Publication No. 2004-129186 (for example, FIG. 7) (Patent Document 2) are examples of the related art.

SUMMARY

Problems to Be Solved by the Invention

When a 3-D viewable synthetic image is formed, by adjusting the relative positions of the feed images for synthesis, it is possible to adjust the depth positions of the persons, articles, etc., included in the image, that is, it is possible to adjust the degree of pop outs or recesses from the image plane. In particular, when the object is set on the same plane as the image plane, it is possible to form a 3-D image that looks as the object is in focus. Here, if there is a function for the user to select the object in focus at will, it will be convenient for the user. However, according to the well-known image processing technology, the configuration in the depth direction is uniquely fixated, and there is no margin for the user to make any selection, or the user has to carry out a manual operation to judge whether the relative position of the image is finely adjusted or not. Anyway, such a function is not easily available for the user.

Some embodiments of the invention provide solutions to the stated problems by allowing adjustment of the depth display of the image carried out easily by the user at will.

Means Used to Solve the Above-Mentioned Problems

An embodiment of the invention provides an image processing apparatus that forms a 3-D viewable synthetic image via a lenticular lens on the basis of the plural feed images having parallax with respect to each other, and has the following means: a means that receives the region assignment input from the user who assigns a portion of the region in a reference feed image among the feed images, a means that detects the region corresponding to the region assigned in the reference feed image from feed images other than the reference feed image, and a synthetic image forming means that has the rectangular images cut out from the plural feed images, respectively, side by side and that forms the synthetic image having the smallest parallax between the assigned region and the corresponding region.

According to the invention, the "corresponding region" in other feed images corresponding to the assigned region of the reference feed image refers to the region with the highest similarity to the image in the assigned region of the reference feed image. In other words, the region with points in the feed image that correspond most to the various points in the assigned region is the "corresponding region" of the feed image.

According to the invention with the aforementioned configuration, when the user selects any region in a feed image, the corresponding region corresponding to the assigned region is detected from the other feed image and, at the same time, a synthetic image is formed so that the parallax between the assigned region and the corresponding region is at a minimum. As a result, when the synthetic image is viewed in 3-D, the object in the assigned region becomes the most vivid, that is, the object is displayed as a focused image. In this case, the user can only carry out the operation in assigning the region of the object that is out of focus, with the subsequent processing operation being carried out automatically. Consequently, the invention provides an option for the user, by which the user can easily adjust the depth display of the image at will.

According to the invention, for example, the following scheme can also be adopted: among the reference feed image and the other feed image, the synthetic image forming means cuts out the rectangular images from the overlapped portion of the images where the assigned region of the reference feed image and the corresponding region of the other feed image overlap each other. In addition, the following scheme can be adopted: the scheme has a shift quantity determining means that determines the image shift quantity corresponding to the other feed image with respect to the reference feed image needed to make the corresponding region of the other feed image overlap with the assigned region of the reference feed image, and the image forming means cuts out the rectangular images from the overlapped image portion as the other feed image is shifted by an image shift quantity with respect to the reference feed image.

With any of these configurations, the synthetic image is formed by cutting out the rectangular images after adjusting the relative position between the feed images so that the parallax at a the minimum for the assigned region of the reference feed image and the corresponding region of the other feed image. Consequently, it is possible to quite vividly display the object included in the region assigned by the user.

One can also adopt a scheme in which, from the regions included in the other feed image and having the same size as that of the assigned region, the detecting means takes the region having the highest correlation with the assigned region as the corresponding region of the other image. In this way, by having a region with a high correlation with the assigned region and with the same size as that of the assigned region as the corresponding region, it is possible to form an image where the desired object by the user can be in focus at a high probability. As a specific means for carrying out this operation, for example, the correlation between the regions can be determined by, for example, the area correlation computing.

One can also adopt a scheme in which there is an image recognition means that extracts the regions having the prescribed characteristic features as the candidate regions by the image recognition process in the reference feed image, with the receiving means having a display unit that displays the reference feed image in a form that allows identification of the candidate regions; at the same time, the user selects one region from the candidate regions as the assigned region. As a result, the user simply selects from the candidate regions displayed on the display unit, and an image with the region in focus is automatically obtained. Here, the well-known face recognition processing technology can be adopted as the image recognition treatment, and the human face can be taken as the candidate region that is the "region having the prescribed characteristic features". In this way, a synthetic image having the prescribed person image included in the feed images in focus is obtained.

Also, the image processing apparatus of the invention can have a printing means that prints out the synthetic image. By combining the printed image with the lenticular lens, it is possible to provide the user with a printed copy of the 3-D image having the desired depth appearance.

As another embodiment, the invention provides an image processing method that forms a 3-D viewable synthetic image via a lenticular lens on the basis of the plural feed images having parallax with respect to each other. This image processing method has the following steps of operation: an assignment receiving step in which a portion of the region in the reference feed image as one of the feed images is assigned by the user, a detection step in which the corresponding region corresponding to the assigned region is detected from a feed image other than the reference feed image, and an image forming step in which the synthetic image is formed by setting side by side the rectangular images cut out from the overlapped portion where the assigned region of the reference feed image and the corresponding region of the other feed image are overlapped with each other.

Just as the invention related to this image processing apparatus, according to the invention of the image processing method with the configuration, it is possible to provide a synthetic image that can most vividly display the object included in the region assigned by the user and the user only needs to assign the region to obtain such a synthetic image.

BRIEF DESCRIPTION OF THE DRAWINGS

Referring now to the attached drawings which form a part of this original disclosure.

DETAILED DESCRIPTION OF EXEMPLARY EMBODIMENTS

Figure 1:
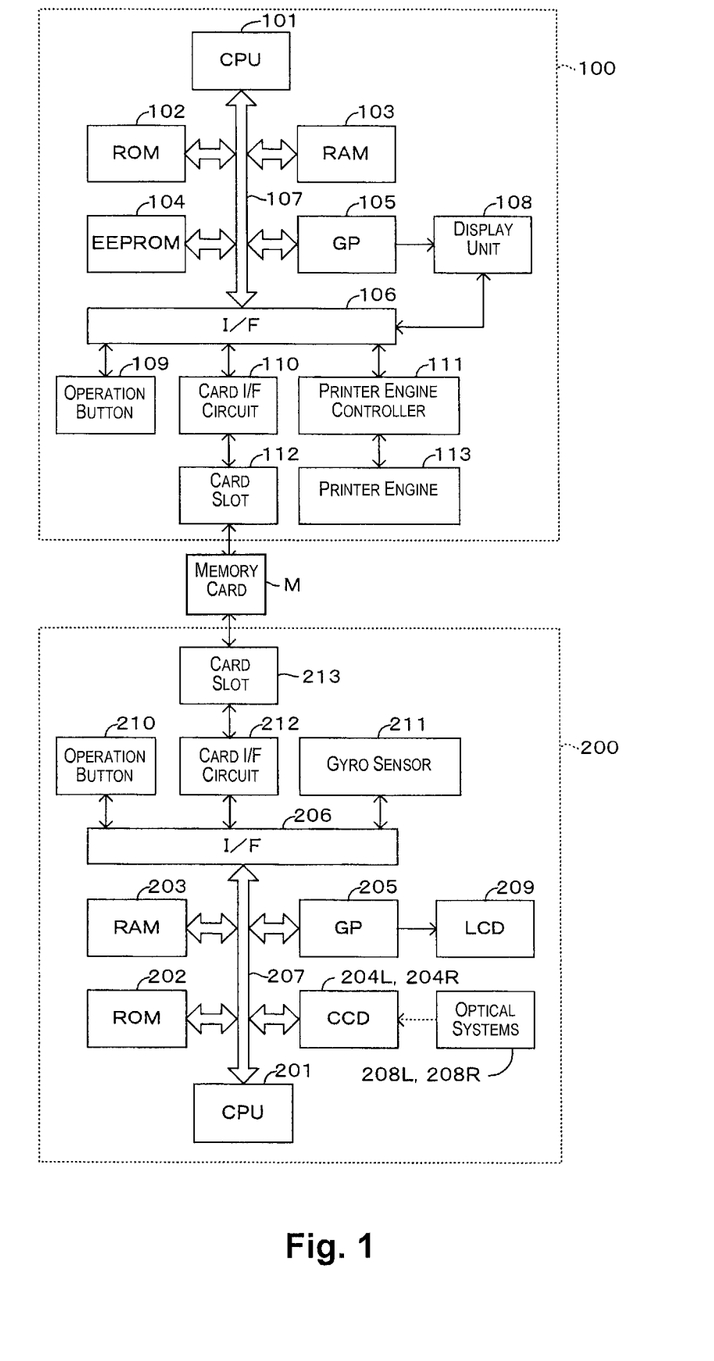
FIG. 1 is a diagram illustrating the printing system that adopts an embodiment of the image processing apparatus related to the invention.

FIG. 1 is a diagram illustrating the printing system adopting an embodiment of the image processing apparatus of the invention. According to this printing system, the image data acquired by picture taking using a digital camera 200 are sent by a memory card M, a USB (universal serial bus) cable, a wireless LAN (Local Area Network), or the like to a printing apparatus 100, and are printed out by the printing apparatus 100. That is, here, the user uses the digital camera 200 to take pictures to generate the image data, and the image data are read and printed as is on the printing apparatus 100 in the so-called direct printing mode. However, the invention is not limited to this printing system. That is, the invention can also be adopted in a printing system in which the image data generated by the digital camera 200 are fetched into a personal computer, a cell phone or the like, and the image data are then sent from the personal computer to the printing apparatus 100 for printing. However, the invention is not limited to the system having both the digital camera 200 and the printing apparatus 100. The invention can also be adopted in any image processing apparatus for the image data in a general sense.

As shown in the drawing, the digital camera 200 has a CPU (central processing unit) 201, a ROM (read-only memory) 202, a RAM (random access memory) 203, CCDs (Charge Coupling Devices) 204L, 204R, a graphic processor (GP) 205 and an interface (I/F) 206 connected with each other via a bus 207. Information can be exchanged among them. Corresponding to the program stored in the ROM 202, the CPU 201 executes various types of arithmetic and logic operations, while it controls the digital camera 200. In this case, the data that are temporarily needed are stored in the RAM 203.

Also, the CCDs 204L, 204R convert the optical images from the object with light collected by the optical systems 208L, 208R into electric signals for output. More specifically, the optical image collected by the optical system 208L is incident on the CCD 204L, while the optical image collected by the optical system 208R is incident on the CCD 204R. The optical systems 208L, 208R are separated from each other on the left/right portions of the case of the digital camera 200, respectively. More specifically, the optical system 208L is arranged on the left side with respect to the object on the front surface of the case of the digital camera 200, while the optical system 208R is arranged on the right side with respect to the object. Consequently, parallax exists between the images taken by the CCDs 204L, 204R, respectively.

The optical systems 208L, 208R each are made of plural lenses and actuators. The actuators work to adjust the focus or the like while the optical images of the object are formed by the plural lenses on the light receiving surfaces of the CCDs 204L, 204R, respectively.

The digital camera 200 can selectively executes the following modes: a 3-D image pickup mode, in which the two CCDs 204L, 204R are used to take a pair of pictures with a parallax between them, and the well-known image pickup mode in which any of the CCDs is used to carry out image pickup. The one pair of image data taken in the 3-D image pickup mode are stored as a correlated pair. In the process for forming the 3-D viewable synthetic image, to be explained later, the image taken by the CCD 204L is used as the feed image for the left eye and the image taken by the CCD 204R is used as the feed image for the right eye.

In addition, the GP 205 executes the image processing for display on the basis of the display command sent from the CPU 201, with the obtained image data for display being sent to the liquid crystal display (LCD) 209 for display.

The I/F 206 provides the input/output function of the digital camera 200. When the information is exchanged between the operation button 210, the gyro sensor 211, and the I/F circuit 212, it performs appropriate conversion for the format of the data for display. The operation button 210 connected to the I/F 206 has the buttons for power supply, mode switching, shutter, etc., as well as the input means that can set the various types of functions. As a result, the user can control the digital camera 200 at will for the desired operation. Here, the gyro sensor 211 generates and outputs a signal indicating the angle (the angle with respect to the horizontal plane) of the camera main body when the image of the object is taken by the digital camera 200. The digital camera 200 generates the various types of information (such as exposure, information about the object, etc.) in the image pickup operation including the angle of the camera main body.

According to the present embodiment, the digital camera 200 has a structure that allows a description of the image pickup information as the Exif (Exchangeable Image File Format) information and the generation of the image file attached on the image data. The structure of the Exif image file basically is the well-known JPEG (Joint Photographic Expert Group) image format. In this image file, the thumbnail image, the image pickup related data, and other data are buried in the format according to the JPEG code. In addition, it has the function of forming and recording the image file (MPO file) on the basis of the MP (Multi Picture) that has plural still picture image data recorded in one image file.

The I/F circuit 212 is an interface for reading the information with the memory card M inserted in the card slot 213. In addition, the I/F 206 also has the function of connecting with the USB, wireless LAN, and other external equipment not shown in the drawing, and it allows exchange of the image file with the printing apparatus 100 either with wires or wirelessly.

The printing apparatus 100 is an apparatus that prints out the images taken by the digital camera 200. The printing apparatus has the following configuration. In the printing apparatus 100, the CPU 101, the ROM 102, the RAM 103, the EEPROM (electrically-erasable-programmable ROM) 104, the GP 105, and the I/F 106 are connected with each other via the bus 107. The information can be exchanged between them. The CPU 101 executes the various types of arithmetic and logic operations corresponding to the programs stored in the ROM 102 and the EEPROM 104, and at the same time, it controls the various sections of the printing apparatus 100. In addition, the CPU 101 has the program and the data as the subject for execution temporarily stored in the RAM 103; it also has the data to be maintained even after turning off the power supply of the printing apparatus stored in the EEPROM 104. Besides, as needed, the CPU 101 sends the display command to the GP 105, the GP 105 executes the image processing for display corresponding to the display command, and the result of the process is sent to the display unit 108 for display.

The I/F 106 is an apparatus that performs appropriate conversion of the data display format when information exchange is carried out between the operation button 109, the card I/F circuit 110, and the printer engine controller 111. In the printing apparatus 100, the operation button 109 has a configuration for pressing to make a menu selection, etc., of the printing apparatus 100. Also, the card I/F circuit 110 is connected to the card slot 112 and the image file generated by the digital camera 200 is read from the memory card M inserted into the card slot 112. Also, the I/F 106 has the function of connection with the USB, the wireless LAN, and other external equipment not shown in the drawing, with the image file being exchanged with the digital camera 200 either by wires or wirelessly.

The display unit 108 has a touch panel arranged on the surface of the display unit made of, for example, an LCD. In addition to displaying the image data sent from the GP 105 on the display unit, the operation input data input by the user on the touch panel are output to the I/F 106.

For the printing apparatus 100, as the image data are received via the memory card M or by data communication, various processes are carried out by the CPU 101 and, at the same time, the printer engine controller 111 controls the printer engine 113 and the image corresponding to the image data is printed. In the following, the 3-D image printing mode will be explained. According to this mode, a 3-D viewable synthetic image is formed from the image data corresponding to one pair of left/right feed images taken by the digital camera 200 in the 3-D image pickup mode and, in combination with a lenticular lens, the image is printed on a recording sheet to form a lenticular image.

In addition, it is possible to execute the various printing operations that can be carried out by the printers of this type. However, these printing operations are well known technologies and they can be adopted in the present embodiment, so they will not be explained in this specification. In addition, the principle of the 3-D viewing by the lenticular image and the method of the principle for forming an image from plural feed images is also well known. Consequently, they will not be explained in detail here.

Figure 2:
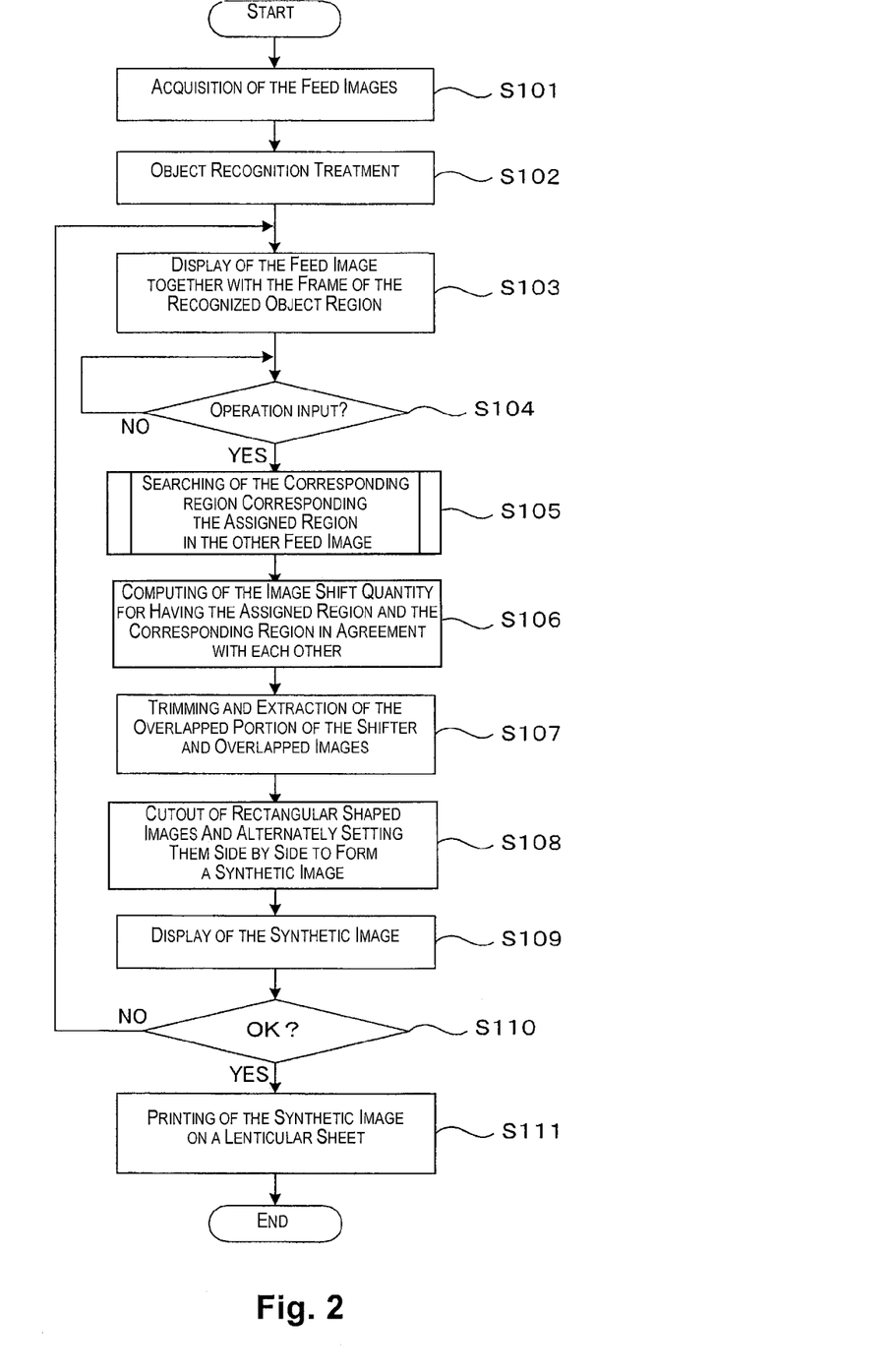
FIG. 2 is a flow chart illustrating the 3-D image printing mode in this embodiment.
Figure 3:
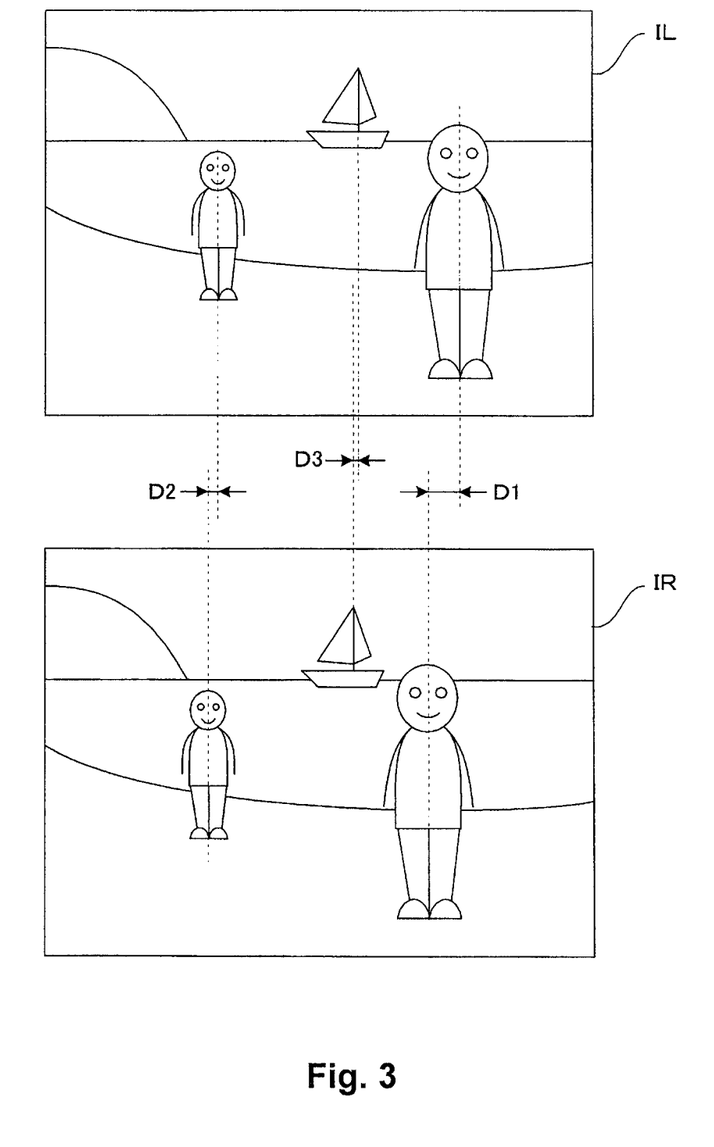
FIG. 3 is a diagram illustrating an example of the feed images.

FIG. 2 is a flow chart illustrating the 3-D image printing mode in this embodiment. FIG. 3 is a diagram illustrating an example of the feed images. In this printing mode, first of all, the feed images as the origin of the 3-D image are acquired (step S101). The feed images should be plural images having parallax with respect to each other. For example, it is possible to use one pair of images taken by the digital camera 200 in the 3-D image pickup mode. However, the feed images are not limited to this type. For example, for a group of plural images taken for the same object from different views, such as a group of images formed using, for example, the computer graphics technology, the technology to be described below can also be adopted. The number of images that include one group of feed images can be 2 or larger.

Here, an explanation will be made on the case in which two images are taken by the digital camera 200 in the 3-D image pickup mode. As shown in FIG. 3, in the 3-D image pickup mode, as shown in FIG. 3, two images IL, IR are taken for the same object from different views. Here, the image IL is an image taken by the CCD 204L arranged on the left side in the digital camera 200; the image is used as the feed image for the left eye when a lenticular image is formed. On the other hand, the image IR is the image taken by the CCD 204R arranged on the right side in the CCD 204L; the image is used as the feed image for the right eye when a lenticular image is formed.

The main objects shared in these images include two persons on the left/right sides, a yacht at the center, and a hill on the upper-left corner. Between the feed image IL for the left eye and the feed image IR for the right eye, there is a delicate difference in the positions of the objects corresponding to the distance between the camera and the objects in the image pickup operation. That is, for a, more distant object, there is little difference in the position between the left/right feed images IL, IR. Thus, the nearer the object is to the camera, the larger the difference in the position of the object corresponding to the subject for picture taking.

In the example shown in FIG. 3, the person on the right side is on the front, and its difference D1 in position between the left/right feed images in the lateral direction is the largest. This difference then decreases in the order of the difference D2 for the position of the left-side person on the back side, followed by the difference D3 of the position of the yacht further on the back side. On the other hand, for a hill that is far away, there is little difference in the position. In addition, for the actual images, the difference in position caused by tilting of the camera, etc., can be added. When plural feed images are taken by individual cameras, and when picture taking is carried out by a single-lens camera via a 3-D adopter, the differences caused by such position shifts can also be added.

When the feed images formed are directly used without trimming to form the 3-D viewable synthetic image, just as in the image pickup state, the farthest object (the hill) has zero parallax, while as the object moves to the front, the parallax increases, with the front object having the largest parallax, appearing to pop out towards the viewer. On the other hand, from the viewpoint of vividness of the objects, there is a tendency that the far-away object free of parallax appears to be the most vivid, while as the object moves to the front, the image becomes blurred. For this type of 3-D image, while the object free of parallax is positioned on the same plane as the image plane and appears vivid, the object with parallax is positioned ahead (or behind) the image plane to display a depth sensation, while as the back-and-forth range that can be displayed is limited, the depth in the image pickup mode cannot be reproduced with a high fidelity, so that such an object is not vivid.

As to be explained below, according to the present embodiment, the user can select the object to be vividly displayed. Consequently, using the same effort as that of focusing by applying the auto focus function in image pickup operation, the user simply selects and inputs the object to be vividly displayed, and, without any fine adjustment of the image by the user operation, it is possible to obtain a 3-D image with the desired object in focus.

The operation for this function can be explained with reference to FIG. 2. Here, any one of the plural feed images taken as is selected and, for the selected feed image, the recognition process is carried out for the object included in the feed image (step S102). Here, suppose the feed image IL for the left eye is selected. The object recognition process can be carried out using the well known technology, such as the face recognition process in which the region having the characteristic features of the human face is extracted, or the process in which each pixel has a pixel value converted to binary values with a prescribed threshold, with the closed region being extracted. Then, together with the information indicating the region of the object extracted from the feed image IL (such as the frame indicating the contour of the object region), the feed image IL is shown on the display unit 108 (step S103).

Figure 4:
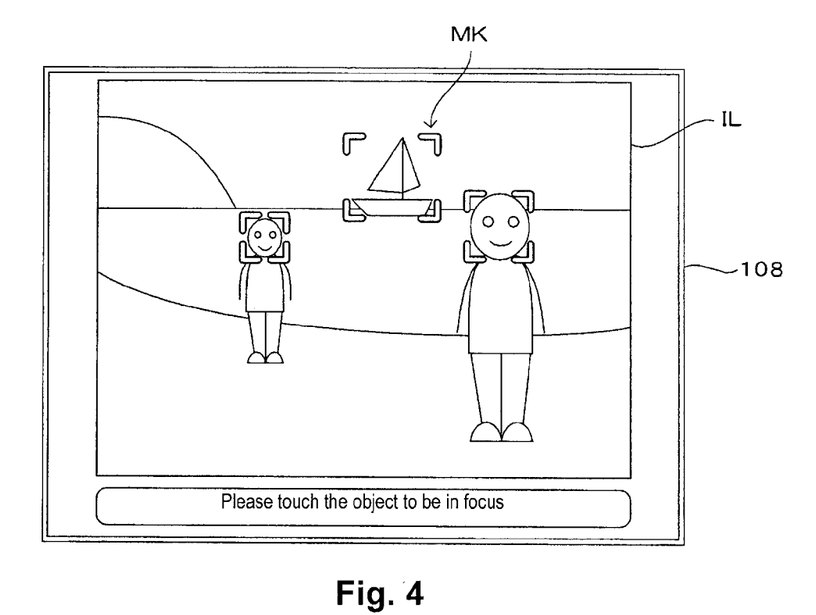
FIG. 4 is a diagram illustrating an example of the displayed image.

FIG. 4 is a diagram illustrating an example of the displayed image. Here, on the display unit 108, the feed image IL that has been selected is displayed. Here, hook shaped markers MK indicating the four corners of the regarding shaped region recognized as the object are overlapped and displayed. In this example, the faces of the left/right persons and the yacht in the central upper portion are recognized as the objects and displayed.

Here, the user selects the object to be displayed most vividly from among the recognized objects by touching the object displayed on the display unit 108 with its surface made of a touch panel. As a result, below the image, a message prompting selection of the object is displayed for the user.

In this state, the message remains for the user to make the operation input for selecting the object (step S104). As the user touches the touch panel to select a certain object as the effective one, the region of the selected object is taken as the assigned region of the feed image IL for the left eye and, in the remaining one feed image, that is, the feed image IR for the right eye, the corresponding region having an image content similar to that of the assigned region is searched (step S105). Here, as shown in FIG. 4, the face of the person on the right side is selected by the user.

Figure 5:
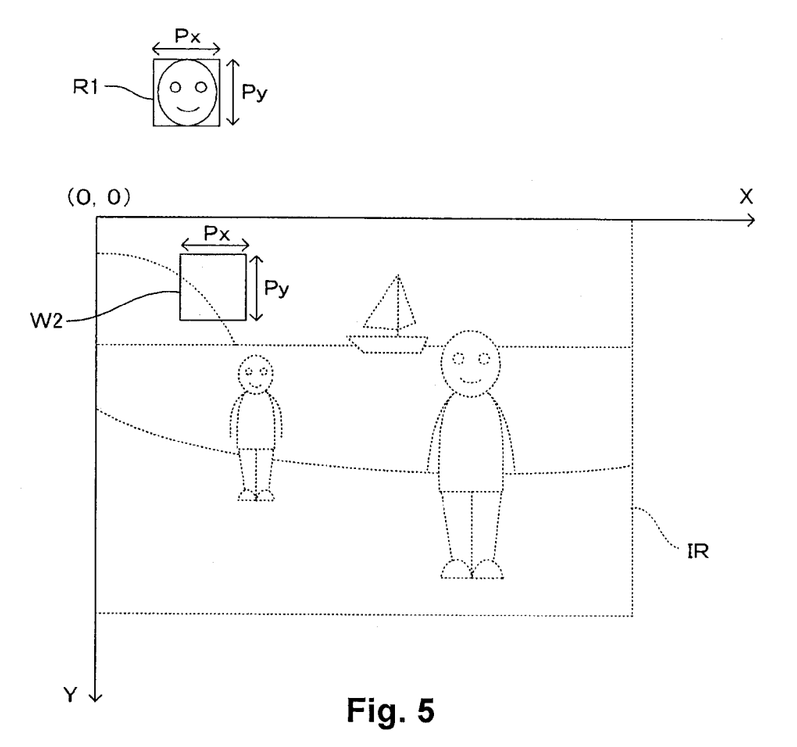
FIG. 5 is a diagram illustrating the principle of the process for searching the corresponding region.
Figure 6:
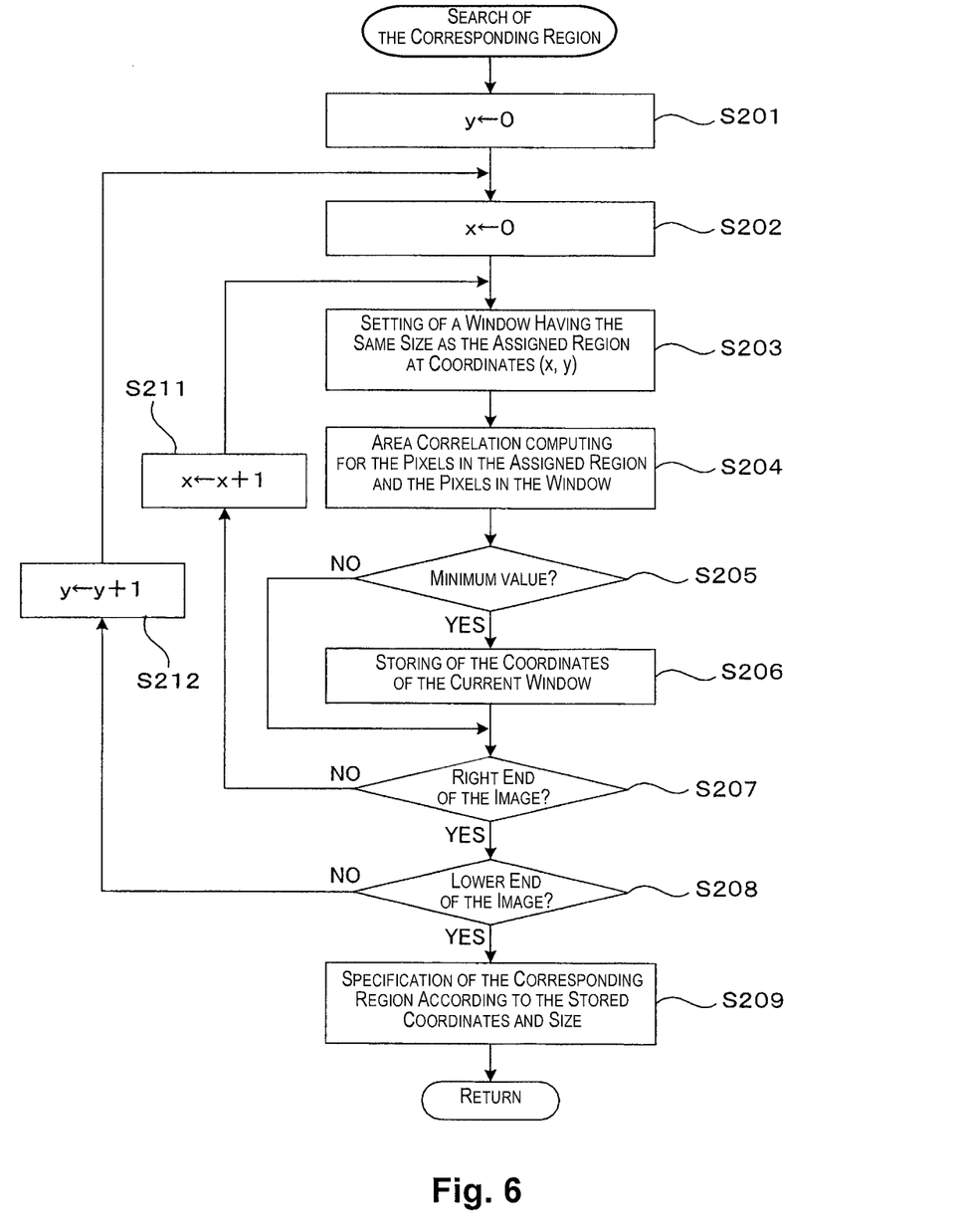
FIG. 6 is a flow chart illustrating an example of the specific operation of the searching process of the corresponding region.

FIG. 5 is a diagram illustrating the principle of the process for searching the corresponding region. FIG. 6 is a flow chart illustrating a specialist operation example. Here, the assigned region R1 selected in the feed image IL for the left eye is a rectangular region having Px pixels in the lateral direction and Py pixels in the vertical direction. In order to detect the corresponding region in the feed image IR for the right eye corresponding to this, the upper-left corner of the feed image IR for the right eye is taken as the origin (0, 0) and, on the coordinate plane with the X-axis in the lateral direction and Y-axis in the vertical direction, a window W2 having the same size as that of the assigned region R1 is set. That is, the window W2 has Px pixels in the lateral direction (X-direction) and Py pixels in the vertical direction (Y-direction).

Next, the similarity is determined between the image content in the window W2 set on the feed image IR for the right eye and the image content of the assigned region R1 assigned on the feed image IL for the left eye. The similarity can be quantitatively evaluated by the height of the correlation between the two image contents. For example, the similarity can be determined by the well known area correlation computing.

The position of the window W2 can be set with various options inside the feed image IR for the right eye. Among them, the region in the feed image IR for the right eye specified by the window W2 with the highest similarity between the image content in the window W2 and the image content in the assigned region R1 can be taken as the region corresponding to the assigned region R1. The corresponding region can be specified by the information obtained by specifying the coordinates of the four corners of the window W2 in this case. For example, this region can be represented by the coordinate position at one of the four corners and the center of gravity and the window size, or by the coordinates of the two apexes located on the diagonal line of the rectangular shape.

In the following, a specific process example will be explained with reference to FIG. 6. At first, the coordinate parameters x, y that assign the position of the window are set at their initial values (0) (steps S201, S202). The coordinates (x, y) specified by these coordinate parameters are taken as the position of the apex at the upper-left corner, and the window W2 having the same size as that of the assigned region R1 (with Px pixels in the lateral direction and Py pixels in the vertical direction) is set inside the feed image IR for the right eye (step S203).

The area correlation between the various pixels in the window W2 set as and the pixels in the assigned region R1 is carried out to determine the similarity of the image contents (step S204). More specifically, the following operation can be carried out. For all of the pixels in the region, computing is carried out to determine the difference between the pixel value of a pixel selected from within the assigned region R1 and the pixel value of the pixel at the position corresponding to it in the window W2, with the integrated value of the absolute value of the difference then being determined. The smaller the integrated value, the higher the correlation of the image contents. That is, suppose the image contents are entirely in agreement with each other, the difference in the pixel value between the corresponding pixels becomes zero, and the integrated value also is zero. The lower the similarity between the image contents, the larger the difference between the pixels, and the integrated value of the absolute value also increases. With such an arithmetic and logic operation, it is possible to determine the similarity between the image contents.

The determined integrated value is then compared with the stored minimum value (step S205). As shown in FIG. 6, in the searching treatment, a loop process is carried out and the integrated value is repeatedly computed repeatedly. The minimum value of the integrated values computed in the various loops and the coordinate position (x, y) of the window set when the minimum value is computed are stored. If the newly computed integrated value is smaller than the minimum value (YES in step S205), the stored minimum value is refreshed to the integrated value and, at the same time, the coordinate position (x, y) of the window in this case is refreshed and stored (step S206). On the other hand, if the integrated value computed in the new loop is larger than the stored minimum value (NO in step S205), the minimum value and the window coordinate position are not refreshed.

The processes carried out in steps S202 through S206 are executed in each step by incrementing the coordinate parameter x by 1 until the right end of the feed image IR of the window is reached (step S207) (step S211); at the same time, the processes carried out in steps S202 through S207 are executed in each step by incrementing the coordinate parameter y by 1 until the lower end of the feed image IR of the window is reached (step S208) (step S212). In this way, the region with an image content having the highest similarity with the assigned region R1 is searched out from the entirety of the feed image IR for the right eye.

That is, the region in the window specified by the coordinate position of the window and the window size stored at the end time point of the loops is detected as the "corresponding region" in the feed image IR for the right eye having an image content corresponding to the image content of the assigned region R1. In the following, the corresponding region in the feed image IR for the right eye corresponding to the assigned region R1 assigned by the feed image IL for the left eye will be represented by key R2.

Now, return to FIG. 2. The image shift quantity of the feed image IR for the right eye with respect to the feed image IL for the left eye needed to have a perfect overlap between the assigned region R1 and the corresponding region R2 determined as is then computed (step S106). Next, from the region that repeats when the feed image IR for the right eye is shifted by the image shift quantity determined as and overlapped with the feed image IL for the left eye, the region corresponding to the size of the string unit to be formed is extracted by trimming (step S107).

Figure 7A:
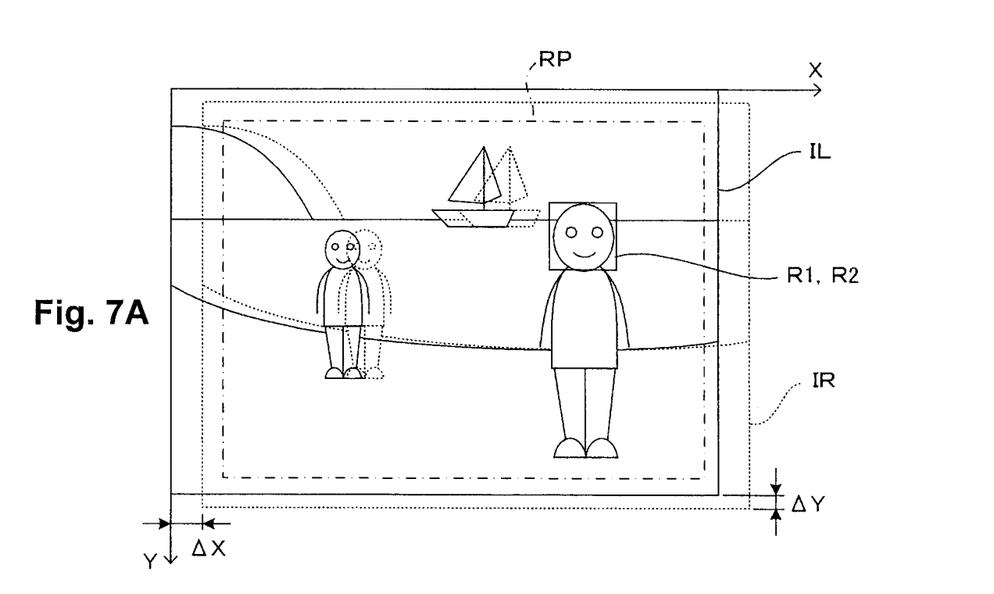
FIGS. 7A and 7B are diagrams illustrating the concept of image shift and trimming.

FIGS. 7A and 7B are diagrams illustrating the concepts of the image shift and trimming. In the example shown in FIG. 7A, when the feed image IR for the right eye is shifted by $\Delta X$ pixels in the ($-X$) direction and by ($-\Delta Y$) pixels in the ($-Y$) direction with respect to the feed image IL for the left eye, the assigned region R1 of the feed image IL for the left eye and the corresponding region R2 of the feed image IR for the right eye are perfectly overlapped with each other. That is, the value of the image shift quantity to be determined is $\Delta X$ in the X-axis direction and $\Delta Y$ in the Y-axis direction, and, as they are attached with signs, they can represent the image shift quantities in the two directions (positive/negative directions). The image shift quantity can be determined from the coordinate position of the assigned region R1 in the feed image IL for the left eye and the coordinate position of the corresponding region R2 for the feed image IR for the right eye.

For example, suppose the upper-left corner of the assigned region R1 in the feed image IL for the left eye has the coordinates of (x1, y1), and the upper-left corner of the corresponding region R2 in the feed image IR for the right eye has the coordinates of (x2, y2), the image shift quantity Sx in the X-direction and the image shift quantity Sy in the Y-direction of the feed image IR for the right eye with respect to the feed image IL for the left eye can be represented as follows:

$$Sx=x1-x2$$

$$Sy=y1-y2$$

Here, if the image shift quantity has a positive value, the image is shifted in the direction of the coordinate axis; if the image shift quantity has a negative value, the image is shifted in the negative direction of the coordinate axis, so that the assigned region R1 of the feed image IL for the left eye and the corresponding region R2 of the feed image IR for the right eye are overlap each other.

The image in the repeated region when the feed image IR for the right eye is shifted to overlap with the feed image IL for the left eye can be used in forming the 3-D image. From this overlapped region, the region corresponding to the aspect ratio of the image to be printed is extracted; this region can be set as the effective printing region RP adopted in the synthetic image.

Now return to FIG. 2. From the images of the trimmed effective printing regions RP among the feed image IL for the left eye and the feed image IR for the right eye, the rectangular images as the images for the left eye and the images for the right eye are cut out and are alternately arranged to form a synthetic image (step S108). The technology for forming the image appropriate for the 3-D viewing by synthesis from the rectangular images cut out from the plural feed images after trimming is a well known technology, so that it will not be explained again here.

The synthetic image prepared as is shown on the display unit 108 (step S109), and the user is asked to check the image content. If the user expresses OK by manipulating the input (step S110), the printer engine 113 is turned on, the synthetic image is printed on the lenticular sheet (step S111), and the process comes to an end. On the other hand, if the user does not express satisfaction (NO in step S110) for the displayed image content, the process returns to step S103, and the user once again selects the object.

In order to provide a 3-D synthetic image (lenticular image), one can also adopt a scheme in which a lenticular lens is bonded on a flat recording material after printing of the synthetic image, or the synthetic image is printed on the other side (a flat surface) of a sheet shaped recording material ("lenticular sheet" in this specification) having a lenticular lens arranged on one side. In the latter case, of course, the longitudinal direction of the rectangular images should be in agreement with the longitudinal direction of the lenticular lens. In addition, as the printed surface is viewed through the lenticular lens from the back side of the printed surface for displaying the image in 3-D, the printed surface should be transparent, and the printing data in a state flipped from the synthetic image shown on the display unit 108 should be sent to the printer engine 113.

As explained above, according to this embodiment, when a 3-D viewable synthetic image is formed from plural feed images having different viewpoints, the user selects and assigns the region of the object to be displayed most vividly from one feed image. Next, the corresponding region having an image content similar to that of the assigned region on the feed image is detected from the other feed image, and these regions are overlap each other. The portion overlapped with the feed image is trimmed to form a synthetic image. As a result, when the synthetic image is viewed in 3-D, the assigned region in one feed image and the corresponding region on the other feed image have the minimum parallax between them. Consequently, the image object in the assigned region can be positioned on the same surface as the image surface and can be displayed most vividly, while the other image objects are displayed to the front side or back side corresponding to the parallax values, so that they are displayed with a depth appearance.

For example, as shown in FIG. 7A, when the face region of the person on the right side is designated as the assigned region R1, image shift and overlap lead result in the face region of the person on the right side becoming more vivid, while the objects corresponding to the other subjects at other distances (the person on the left side, the yacht and the faraway hill, etc.) display significant position offsets. Consequently, for the synthetic image obtained in this state, while the portion near the face of the person on the right side is positioned on the same plane as the image plane and can be displayed vividly, the other objects are displayed a little blurred on the front side or back side, respectively, from the face of the person on the right side.

Figure 7B:
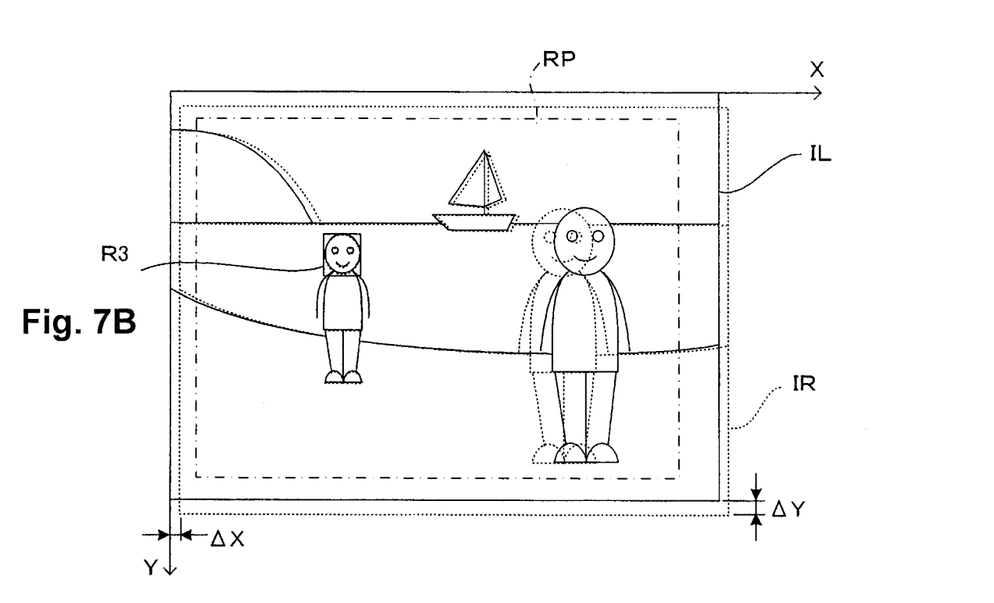

Also, for example, as shown in FIG. 7B, when the face region R3 of the person on the left side is designated as the assigned region, for the synthetic image, the person on the left side can be displayed vividly, while for the person on the right side, the position offset quantity between the image for the left eye and the image for the right eye becomes larger, and the person's image becomes blurred. In this way, the user can adjust where to display the image in the depth direction of the image according to his/her preference.

The operation that the user needs to carry out to obtain such an image is simply the designation of the assigned region in one feed image, and there is no need to perform the manual operation to adjust the image shift quantity. Consequently, according to this embodiment, the user can adjust the image easily at will to obtain the desired 3-D image. This is true even when there are plural feed images. In particular, the region recognized by the object recognition process for the feed image is displayed together with the feed image, and the user can use the touch panel to select them. Consequently, the selection operation can be completed simply as the user selects the favored register on the display, so that the operation becomes very simple.

In addition, the process for detecting the region corresponding to the assigned region on a feed image from the other feed image can be carried out by determining the difference in the pixel value between the region fetched from the other feed image and the assigned region, followed by integration, then the region with the minimum integrated value is searched. This is a very simple arithmetic and logic operation, so that the process contents can be well handled by a processor without a high processability. Consequently, the use of this technology does not boost the cost of the apparatus, and the functions can be realized even in low-price products.

In the embodiment, the image shift quantity is set so that the assigned region corresponding to the object assigned by the user on one feed image and the corresponding region on the other feed image corresponding to this assigned region are in agreement with each other on the synthetic image. That is, the synthetic image is formed with the assigned object vividly positioned on the image plane. However, the depth display method for a lenticular image can also be carried out as follows in addition to this scheme.

Figure 8A:
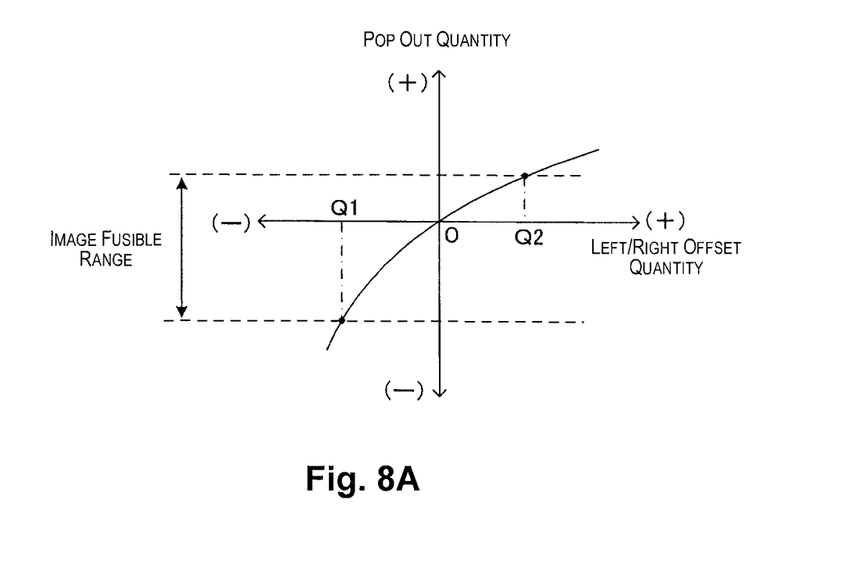
FIGS. 8A and 8B are diagrams illustrating another embodiment of the 3-D image printing mode.
Figure 8B:
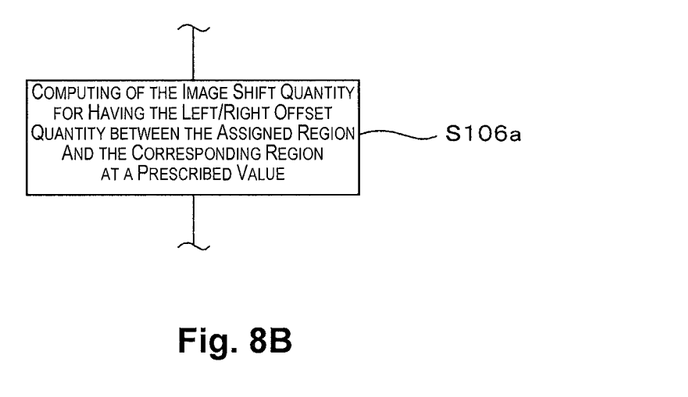

FIGS. 8A and 8B are diagrams illustrating another embodiment of the 3-D image printing mode. FIG. 8A shows the relationship between the position offset quantity in the left/right direction of the corresponding object between the image for the left eye and the image for the right eye and the pop out quantity of the object as it appears to pop out or recess from the image plane. For the abscissa, the (+) direction corresponds to the case in which the corresponding object on the image for the right eye is located on the right side on the synthetic image with respect to the object on the image for the left eye, and the (−) direction corresponds to the opposite case. On the other hand, for the ordinate, the (+) direction corresponds to the state in which the object flies out forward from the image plane when viewed as 3-D, and the (−) direction corresponds to the state in which it recesses back from the image plane. As shown in FIG. 8A, the pop out quantity of the corresponding object from the image plane varies corresponding to the left/right offset quantity of the corresponding object between the image for the right eye and the image for the left eye.

Here, if the left/right offset quantity of the object is too large, the viewer sees the images of the object incident into the left/right two eyes as double views instead of recognition as the images of the same object. That is, there is a limit for the range of distance in the depth direction where the images of the object incident to the two eyes can be viewed as a single object without blurring by the viewer (the image fusible range). In the 3-D image display using a lenticular sheet, the image fusible range is limited by the characteristics of the lenticular lens and the printing precision, etc.

In other words, when the left/right offset quantity between the image for the right eye and the image for the left eye of the object assigned by the user is within the image fusible range, it is possible to make various types of 3-D displays without sacrificing the vividness of the corresponding object. For example, when the left/right offset quantity Q1 corresponding to the lower limit of the image fusible range is given to the corresponding object, the corresponding object is positioned at the deepest site within the image fusible range. On the contrary, when the left/right offset quantity Q2 corresponding to the upper limit of the image fusible range is given to the object, the corresponding object is positioned on the front side in the image fusible range. If the left/right offset quantity is larger than that, the image of the object becomes blurred. However, by setting the value of the left/right offset between Q1 and Q2 appropriately, it is possible to exploit the depth that allows the display by the lenticular sheet to the upper limit. In particular, for the image including plural subjects for image pickup with various different locations in the depth direction, it is possible to efficiently display their back-and-forth relationship.

As the user sets the pop out quantity of the image, it is possible to provide a lenticular image with the depth display corresponding to the preference of the user. Because a simple operation by the user can realize such a function, the following schemes can be adopted. As the first example, the options that can be selected by the user are limited, and the depth position of the assigned object is selected from the front, the back, and the same plane as the image plane in the image fusible range. As the second example, on the display screen for the user to assign the object (FIG. 4), a slider is displayed as a GUI (graphical user interface) part corresponding to the image fusible range. Next, as the user manipulates the knob of the slider, it is possible to continuously set the left/right offset quantity within the image fusible range (Q1~Q2). Of course, the operation schemes are not limited to these.

The process that allows printing of the image with the depth display as selected by the user can be carried out by making partial changes for the operation of the 3-D image printing mode shown in FIG. 2. Here, instead of step S106, the step S106a shown in FIG. 8B is set. In step S106a, the left/right offset quantity between the image for the right eye and the image for the left eye for realizing the image pop out quantity set by the user is determined from the relationship shown in FIG. 8A, and the image shift quantity is computed so that the position offset quantity between the assigned region R1 and the corresponding region R2 on the synthetic image is in agreement with the determined value. On the basis of the image shift quantity obtained in this way, formation of the synthetic image and printing of the synthetic image are carried out in the same way as in this embodiment, so that it is possible to form a lenticular image with the depth display corresponding to the preference of the user.

In this way, the pop out quantity of the object corresponding to the region assigned by the user from the image plane can be set by the user within the image fusible range corresponding to the characteristic features of the printing apparatus and the recording media. By determining the image shift quantity for realizing the left/right shift quantity corresponding to setting and forming the synthetic image, it is possible to provide the user with a lenticular image corresponding to the preference of the user. This embodiment corresponds to the case in which the pop out quantity of the assigned object is fixed at zero.

As explained above, according to this embodiment, the printing apparatus 100 works as the "image processing apparatus" of the invention, the display unit 108 has the functions of the "display unit" and "receiving means" of the invention, and the printer engine 113 works as the "printing means" of the invention. Also, as the CPU 101 executes the prescribed control programs, the various functions of the "detecting means", "shift quantity computing means", "synthetic image forming means" and "image recognition means" of the invention are realized.

In the aforementioned embodiment, the feed image IL for the left eye corresponds to the "reference feed image" of the invention, and the feed image IR for the right eye corresponds to the "other feed image" of the invention. They both correspond to the "feed images" of the invention. In the example of an image shown in FIG. 4, the various image regions (faces of the left/right persons and the yacht) specified by the markers MK correspond to the "candidate regions" of the invention.

However, the invention is not limited to this embodiment. As long as its gist is observed, various modifications can be made. For example, in this embodiment, the left/right feed images IL, IR taken from left/right two views are adopted to form the lenticular image. However, there is no specific restriction on the number of feed images as long as it is 2 or more. This technology can also be adopted in forming a synthetic image from the feed images from plural viewpoints, respectively. More specifically, when one of the feed images is taken as a reference in designating the assigned region on the feed image, the corresponding regions are detected from the other images, respectively, and the image shift quantity with respect to the reference feed image is computed for each feed image, with a synthetic image being formed on the basis of the trimmed images from the overlapped portions of all of the feed images.

In this case, in principle, any of the plural feed images can be taken as the reference. However, from the viewpoint of practical applications, it is preferred that the feed image with a view near the center among the various views be taken as the reference. When the feed image with an outer view is the assigned region, the offset between the image content with the feed image from the view on the opposite side becomes larger, and the detection precision can be degraded when the corresponding regions corresponding to the assigned region are detected from the other feed images.

In this embodiment, the user selects the assigned region from among the object regions recognized by the object recognition treatment. However, instead of this scheme, or accompanying this scheme, one can also adopt a scheme in which the two apexes on the diagonal line are assigned, so that any region can be taken as the assigned region. As far as the method for presenting the recognized object region is concerned, it is not limited to the scheme in which the four corners are indicated by the markers MK. For example, one can also adopt a scheme in which the corresponding region is surrounded by a regarding frame, and the luminance of the corresponding region is changed, or an other scheme. Also, the method for receiving the operation input is not limited to the touch panel. One can also use the input from a keyboard or a mouse, or any other appropriate schemes.

In the embodiment, the image processing method of the invention is executed on a printing apparatus 100 that includes a printing system together with a digital camera 200. However, the subjects of application of the invention are not limited to this. For example, the same image processing method can also be adopted on a digital camera or printer, a portable terminal device, a personal computer, etc.

In this embodiment, the formed synthetic image is displayed on the display unit 108 and, after the user is asked to check the image content, printing is carried out on a recording sheet. However, such a display and checkup operation of the image are not a necessity.

The image processing apparatus and the image processing method of the invention are preferably adopted in forming a 3-D viewable synthetic image via, e.g., a lenticular lens. In addition to the case of printing and output of the image on a recording sheet, this apparatus and method can also be adopted when the image is displayed on a screen and presented together with a lenticular lens.

What is claimed is:

1. An image processing apparatus that forms a 3-D viewable synthetic image via a lenticular lens based on plural feed images having parallax from each other, the image processing apparatus comprising:
   a processor that extracts a plurality of candidate objects each of which has a prescribed characteristic feature by image recognition treatment in a reference feed image among the feed images,
   displays in a display the candidate objects and a plurality of region indicators indicating candidate regions including the candidate objects, respectively,
   receives input of one of the candidate regions from a user, who selects the one of the candidate regions in the reference feed image and assigns the one of the candidate regions as an assigned region,
   detects a corresponding region corresponding to the assigned region assigned in the reference feed image from each other feed image other than the reference feed image, and
   cuts out rectangular shaped images from the plural feed images, respectively, side by side and forms the synthetic image with a smallest parallax between the assigned region and the corresponding region.

2. The image processing apparatus according to claim 1, wherein
among the reference feed image and the other feed image, the processor cuts out the rectangular shaped images from an overlapped portion of those images where the assigned region of the reference feed image and a corresponding region of the other feed image are overlapped with each other.

3. The image processing apparatus according to claim 2, wherein
the processor determines an image shift quantity corresponding to the other feed image with respect to the reference feed image needed for having the corresponding region of the other feed image to overlap with the assigned region of the reference feed image,
wherein the processor cuts out the rectangular shaped images from an image overlapped portion overlapped as the other feed image is shifted by an image shift quantity with respect to the reference feed image.

4. The image processing apparatus according to claim 1, wherein
from the regions included in the other feed image and having a same size as that of the assigned region, the processor takes the region with a highest correlation with the assigned region as the corresponding region of the other image.

5. The image processing apparatus according to claim 4, wherein
the processor determines the correlation between the region in the other feed image and the assigned region by area correlation computing.

6. The image processing apparatus according to claim 1, further comprising a printer engine that prints out the synthetic image.

7. An image processing method that forms a 3-D viewable synthetic image via a lenticular lens based on plural feed images having parallax from each other, the image processing method comprising:
extracting a plurality of candidate objects each of which has a prescribed characteristic feature by image recognition treatment in a reference feed image among the feed images;
displaying in a display the candidate objects and a plurality of region indicators indicating candidate regions including the candidate objects, respectively:
receiving input of one of the candidate regions from a user, who selects the one of the candidate regions in the reference feed image and assigning the one of the candidate regions as an assigned region;
detecting a corresponding region corresponding to the assigned region from each other feed image other than the reference feed image; and
forming a synthetic image by setting side by side rectangular shaped images that are cut out from an overlapped portion where the assigned region of the reference feed image and the corresponding region of the other feed image are overlapped with each other, in the reference feed image and the other feed image.

8. The image processing apparatus according to claim 1, wherein
the processor further displays in the display a message prompting selection of the one of the candidate objects for the user.

* * * * *